(12) United States Patent
Mayer et al.

(10) Patent No.: US 10,907,605 B2
(45) Date of Patent: Feb. 2, 2021

(54) IGNITION APPARATUS HAVING A SPRING FOR ELECTRICALLY CONNECTING A SPARK PLUG

(71) Applicant: Bayerische Motoren Werke Aktiengesellschaft, Munich (DE)

(72) Inventors: Christian Mayer, Holzkirchen (DE); Peter Pawlik, Otterfing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/372,486

(22) Filed: Apr. 2, 2019

(65) Prior Publication Data

US 2019/0226442 A1 Jul. 25, 2019

Related U.S. Application Data

(63) Continuation of application No. PCT/EP2017/073115, filed on Sep. 14, 2017.

(30) Foreign Application Priority Data

Oct. 5, 2016 (DE) .................. 10 2016 219 281

(51) Int. Cl.
*F02P 3/02* (2006.01)
*F02P 13/00* (2006.01)
(Continued)

(52) U.S. Cl.
CPC ................. *F02P 3/02* (2013.01); *F02P 13/00* (2013.01); *F16F 1/046* (2013.01); *H01T 13/04* (2013.01); *F02D 2400/22* (2013.01); *F02P 7/00* (2013.01)

(58) Field of Classification Search
CPC ...... F02P 3/02; F02P 13/00; F02P 7/00; F16F 1/046; H01T 13/04; F02D 2400/22
See application file for complete search history.

(56) References Cited

U.S. PATENT DOCUMENTS

| 2,237,362 A | 4/1941 | O.A. Rieman |
| 5,170,767 A * | 12/1992 | Wada ................ F02P 13/00 123/633 |

(Continued)

FOREIGN PATENT DOCUMENTS

| CN | 102016290 A | 4/2011 |
| CN | 102472241 A | 5/2012 |

(Continued)

OTHER PUBLICATIONS

International Search Report (PCT/ISA/210) issued in PCT Application No. PCT/EP2017/073115 dated Nov. 20, 2017 with English translation (five pages).

(Continued)

*Primary Examiner* — Joseph J Dallo
(74) *Attorney, Agent, or Firm* — Crowell & Moring LLP

(57) ABSTRACT

An ignition apparatus for an internal combustion engine includes a spark plug, an ignition coil with a voltage connection, and a spring for electrically connecting the spark plug to the voltage connection. A continuous spring wire in the form of external turns extends from an ignition coil-side end of the spring to a spark plug-side end of the spring. The spring wire at the spark plug-side end continues in the form of internal turns within the external turns in a direction toward the ignition coil-side end.

10 Claims, 2 Drawing Sheets

(51) Int. Cl.
*H01T 13/04* (2006.01)
*F16F 1/04* (2006.01)
*F02P 7/00* (2006.01)

(56) References Cited

U.S. PATENT DOCUMENTS

| | | | | |
|---|---|---|---|---|
| 5,268,663 | A * | 12/1993 | Takeuti | F02P 13/00 29/609 |
| 5,679,012 | A * | 10/1997 | Murata | F02P 3/02 439/125 |
| 6,247,943 | B1 | 6/2001 | Moga et al. | |
| 6,426,626 | B1 * | 7/2002 | Kravis | F02P 3/02 324/378 |
| 6,668,810 | B1 * | 12/2003 | St. John | F02P 3/02 123/634 |
| 8,723,406 | B2 | 5/2014 | Kato | |
| 9,194,359 | B2 | 11/2015 | Steinberger | |
| 2001/0050606 | A1 * | 12/2001 | Nakamura | F02P 3/02 336/96 |
| 2004/0055587 | A1 | 3/2004 | Hiramatsu et al. | |
| 2004/0113735 | A1 * | 6/2004 | Takeyama | H01T 13/44 336/90 |
| 2005/0199411 | A1 * | 9/2005 | Doll | H01T 13/04 174/86 |
| 2012/0186568 | A1 * | 7/2012 | Steinberger | H01T 13/04 123/634 |
| 2014/0328002 | A1 * | 11/2014 | Silva | F02P 3/02 361/254 |
| 2018/0025837 | A1 * | 1/2018 | Tridico | H01F 27/29 123/634 |

FOREIGN PATENT DOCUMENTS

| | | |
|---|---|---|
| CN | 202954911 U | 5/2013 |
| CN | 204436673 U | 7/2015 |
| DE | 103 52 122 A1 | 5/2004 |
| DE | 10 2009 035 897 A1 | 2/2011 |
| GB | 2 073 494 A | 10/1981 |
| JP | 3-47475 A | 2/1991 |
| JP | 2002-227755 A | 8/2002 |
| JP | 2002-266738 A | 9/2002 |
| KR | 10-2008-0028114 A | 3/2008 |
| KR | 10-2008-0028116 A | 3/2008 |
| WO | WO 2008/148765 A1 | 12/2008 |
| WO | WO 2011/015427 A2 | 2/2011 |

OTHER PUBLICATIONS

German-language Written Opinion (PCT/ISA/237) issued in PCT Application No. PCT/EP2017/073115 dated Nov. 20, 2017 (five pages).
German-language Office Action issued in counterpart German Application No. 10 2016 219 281.7 dated May 11, 2017 (six pages).
Chinese Office Action issued in Chinese application No. 201780060433.8 dated Sep. 8, 2020, with English translation (Thirteen (13) pages).

\* cited by examiner

IGNITION APPARATUS HAVING A SPRING FOR ELECTRICALLY CONNECTING A SPARK PLUG

CROSS REFERENCE TO RELATED APPLICATIONS

This application is a continuation of PCT International Application No. PCT/EP2017/073115, filed Sep. 14, 2017, which claims priority under 35 U.S.C. § 119 from German Patent Application No. 10 2016 219 281.7, filed Oct. 5, 2016, the entire disclosures of which are herein expressly incorporated by reference.

BACKGROUND AND SUMMARY OF THE INVENTION

The invention relates to an ignition apparatus for an internal combustion engine, having a spark plug, an ignition coil with a voltage connection and a spring for electrically connecting the spark plug to the voltage connection. Furthermore, the invention relates to an internal combustion engine with such an ignition apparatus as well as a motor vehicle with such an internal combustion engine.

For the safe voltage supply of a spark plug, a permanent electrical contact must be assured between the ignition coil and the spark plug. For this purpose, springs are usually employed. In order to avoid voltage surges and thus "electrical breakdowns" at so-called tips, such as the end of a compression spring, a spring for the transfer of the ignition voltage may be configured in a conical manner at one spring end. Such a conically tapering spring is known, for example, from DE 10 2009 035 897 A1. This document describes an ignition arrangement with an ignition coil, a spark plug and a spring for electrically connecting the ignition coil to the spark plug. The spring described there has a contact segment pointing toward the spark plug, having an outer circumference tapering toward the spark plug as compared to the rest of the outer circumference. The tapered segment of the spring is received by a likewise tapering recess.

In such ignition arrangements, a free wire end of the spring wire forms a termination of the spring facing toward the spark plug. A high electrical field density prevails at this free wire end, which in turn results in a high electrical field strength. This high energy density needs to be controlled in order to prevent voltage breakdowns.

One problem which the invention proposes to solve is to provide an ignition arrangement which is advantageous in terms of a voltage transfer to the spark plug.

According to one exemplary embodiment of the invention, an ignition apparatus for an internal combustion engine is provided, comprising a spark plug; an ignition coil with a voltage connection; and a spring for electrically connecting the spark plug to the voltage connection, wherein a continuous spring wire in the form of external turns extends from an ignition coil-side end of the spring to a spark plug-side end of the spring. The spring wire at the spark plug-side end, especially at least in the unloaded state of the spring, especially in the unloaded and loaded state of the spring, continues in the form of internal turns within the external turns in a direction toward the ignition coil-side end. By virtue of such a spring, the problematical sharp contours of the spring wire end are positioned inside the spring. The high electrical field density and thus the high electrical energy density are shrouded by the potential of the external turns. In this way, the spring geometry itself creates a sufficiently homogeneous electrical field distribution. A breakdown at the spark plug-side end can therefore be even better prevented.

According to another exemplary embodiment of the invention, the ignition apparatus is designed such that the internal turns taper along a longitudinal axis of the spring in a direction away from the spark plug-side end. At the same time, the internal turns create a recess which serves as a socket for receiving an electrical contact point of the spark plug.

According to one exemplary embodiment of the invention, the predominant length of the spring, i.e., more than 50% of the length, has a substantially cylindrical outer contour. The length here is the dimension measured along the longitudinal axis of the spring from an ignition coil-side end to a spark plug-side end of the spring.

According to one exemplary embodiment of the invention, an electrical contact point of the spark plug is placed inside the internal turns and a wire end of the spring wire is further removed from the spark plug-side end of the spring than the electrical contact point, especially a point of the electrical contact point protruding furthest toward the ignition coil-side end.

According to one exemplary embodiment of the invention, the average distance between adjacent external turns is larger than the average distance between adjacent internal turns.

Furthermore, the invention provides an internal combustion engine with such an ignition apparatus and a motor vehicle with such an internal combustion engine.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
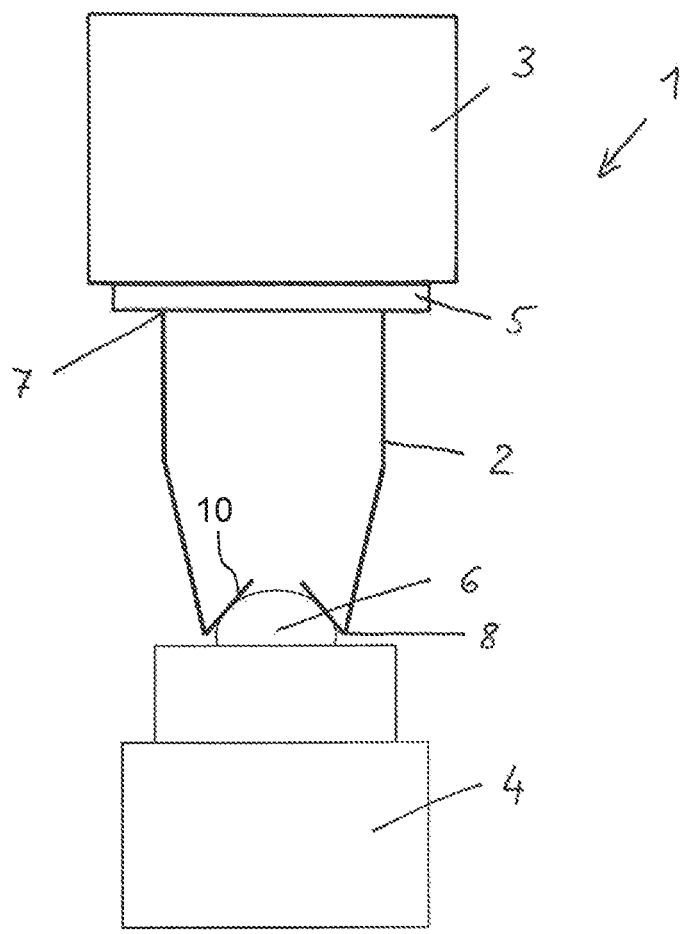
FIG. 1 is a schematic diagram of an ignition apparatus according to one exemplary embodiment of the invention, with only the outline of one spring being represented.

FIG. 1 shows, in a highly schematized manner, an ignition apparatus 1 according to one exemplary embodiment of the invention. An essential aspect of this invention is the configuration of a spring 2 which produces an electrical contact between an ignition coil 3 and a spark plug 4. The spark plug 4, as is known, serves for igniting a flammable mixture in a combustion chamber of an internal combustion engine (not shown). More precisely, an electrical voltage is applied from the ignition coil 3 across a voltage connection 5 of the ignition coil 3 to the spring 2 and transferred across an electrical contact point 6 of the spark plug 4 to the spark plug 4.

Figure 2:
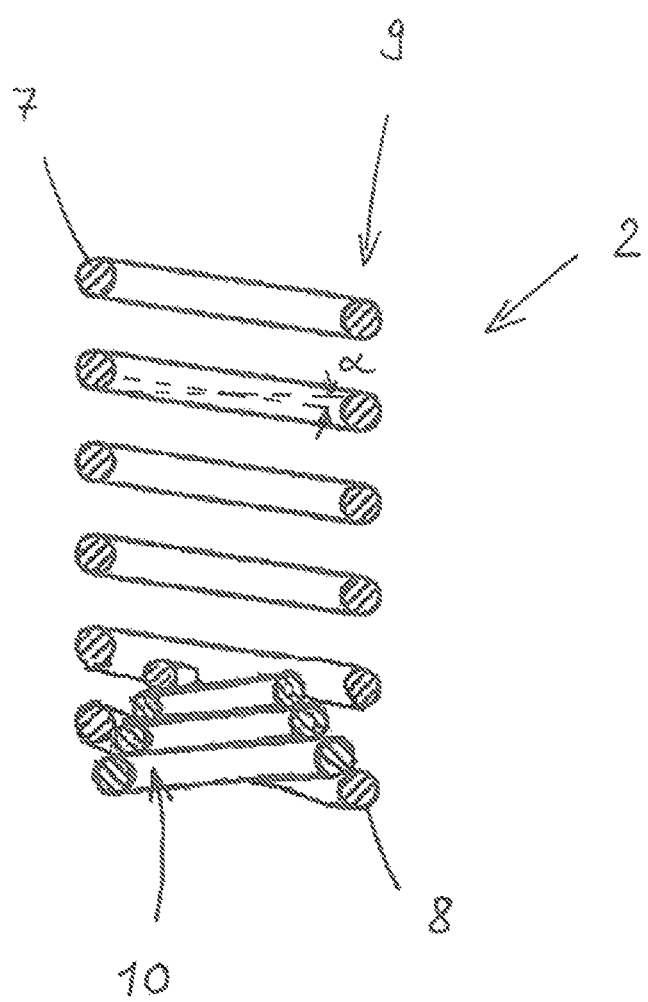
FIG. 2 shows the spring of the ignition apparatus according to the exemplary embodiment of FIG. 1.

The structure of the spring 2 is explained more closely with reference to FIG. 2, where FIG. 2 shows in particular the spring in the unloaded state. The spring 2 is constructed from a continuous spring wire, consisting of an electrically conductive material. The spring wire extends in the form of external turns 9 from an ignition coil-side end 7 in spirals about a longitudinal axis toward a spark plug-side end 8. Preferably, the external turns 9 have a substantially cylindrical outer contour and preferably regularly spaced external turns 9 for at least 50% of the length from the ignition coil-side end 7 to the spark plug-side end 8. Even more preferably, this is the case for over 80% of this length and more preferably for 90% of this length. The remaining segment (the length from the ignition coil-side end 7 to the spark plug-side end 8) may taper for example toward the spark plug-side end 8 (i.e., a diameter of the external turns 9 becomes smaller), for example the external turns 9 on this segment may have a conical configuration. In particular, this remaining segment is situated at the spark plug-side end 8 of the spring 2. The spring 2, furthermore, is a compression spring, whose predominant number of external turns 9 in the unloaded case, i.e., more than 50%, even more preferably more than 80%, are spaced apart from at least one of the adjacent external turns 9. At the spark plug-side end, one, two or three turns are arranged with no spacing.

At the spark plug-side end 8, the continuous spring wire continues in the form of internal turns 10 within the external turns 9 in a direction toward the ignition coil-side end 7. The spring wire at the spark plug-side end 8 continues in the form of the internal turns 10 in spirals about the longitudinal axis. A pitch angle α of the external turns 9 is opposite to a pitch angle α of the internal turns 10, but is not necessarily the same in magnitude. The pitch angle α of the external or internal turns is the angle subtended by the osculating plane of the turns with a plane perpendicular to the longitudinal axis, as shown in FIG. 2. Preferably, the diameter of the internal turns 10 tapers from the spark plug-side end 8 to the ignition coil-side end 7. In particular, a conical shape is formed in this way. Preferably, the internal turns 10 are not spaced apart from one another, i.e., they lie against one another. The internal turns 10 in regard to their diameter fit entirely inside the external turns. The internal turns 10 extend preferably across a length (along the longitudinal axis) of not more than 50%, even more preferably not more than 30%, of the length (along the longitudinal axis) of the external turns 9. An average distance between the external turns 9, i.e., the sum of the distances between adjacent external turns 9 divided by the number of distances, is larger than an average distance between the internal turns 10, i.e., the sum of the distances between adjacent internal turns 10 divided by the number of distances. The distances here are measured in any given angle position (the same for the internal and external turns) and each time between adjacent points of the spring wire in this angle position.

Referring to FIG. 1, the spark plug-side end 8 of the spring 2 lies against the electrical contact point 6 and is in electrically conductive contact with it. The ignition coil-side end 7 of the spring 2 lies against the voltage connection 5 and is in electrically conductive contact with it. The internal turns 10 form a recess which serves as a socket for the electrical contact point 6.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An ignition apparatus for an internal combustion engine, comprising:
   a spark plug;
   an ignition coil with a voltage connection; and
   a spring for electrically connecting the spark plug to the voltage connection, wherein
   a continuous spring wire of the spring in the form of external turns extends from an ignition coil-side end of the spring to a spark plug-side end of the spring,
   the continuous spring wire at the spark plug-side end continues in the form of internal turns within the external turns in a direction toward the ignition coil-side end, and
   the internal turns at the spark plug-side end taper along a longitudinal axis of the spring in a direction away from the spark plug-side end such that the internal turns have a larger diameter at the spark-plug side end than at the ignition coil-side end.

2. The ignition apparatus as claimed in claim 1, wherein a predominant length of the spring has a substantially cylindrical outer contour.

3. The ignition apparatus as claimed in claim 1, wherein an electrical contact point of the spark plug is placed inside the internal turns and a wire end of the spring wire is further removed from the spark plug-side end of the spring than the electrical contact point.

4. The ignition apparatus as claimed in claim 1, wherein an average distance between adjacent external turns is larger than an average distance between adjacent internal turns.

5. A spring for electrically connecting a spark plug to a voltage connection in an ignition apparatus, comprising:
   a continuous spring wire formed with external turns configured to extend from an ignition coil-side end of the spring to a spark plug-side end of the spring, wherein
   the continuous spring wire continues at the spark plug-side end of the spring forming internal turns within the external turns, the internal turns extending in a direction away from the spark plug-side end toward the ignition coil-side end and being configured to receive an electrical contact point of the spark plug, wherein the internal turns at the spark plug-side end taper along a longitudinal axis of the spring in a direction away from the spark plug-side end such that the internal turns have a larger diameter at the spark-plug side end than at the ignition coil-side end.

6. The spring as claimed in claim 5, wherein a predominant length of the spring has a substantially cylindrical outer contour.

7. The spring as claimed in claim 5, wherein a wire end of the continuous spring wire extends toward the ignition coil-side end of the spring farther than the electrical contact point of the spark plug.

8. The spring as claimed in claim 5, wherein an average distance between adjacent external turns is larger than an average distance between adjacent internal turns.

9. An internal combustion engine with an ignition apparatus as claimed in claim 1.

10. A motor vehicle with an internal combustion engine as claimed in claim 9.

* * * * *